(12) United States Patent
Shin et al.

(10) Patent No.: US 12,728,836 B2
(45) Date of Patent: Sep. 8, 2026

(54) DEVICE AND METHOD WITH CONTINUOUS REAL-TIME AUTONOMOUS PARKING PLANNING AND CONTROL

(71) Applicants: SAMSUNG ELECTRONICS CO., LTD., Suwon-si (KR); Seoul National University R&DB Foundation, Seoul (KR)

(72) Inventors: Seho Shin, Suwon-si (KR); Jaeheung Park, Seoul (KR); Minsoo Kim, Seoul (KR); Joonwoo Ahn, Seoul (KR)

(73) Assignees: Samsung Electronics Co., Ltd., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 248 days.

(21) Appl. No.: 18/332,146

(22) Filed: Jun. 9, 2023

(65) Prior Publication Data

US 2024/0092345 A1 Mar. 21, 2024

(30) Foreign Application Priority Data

Sep. 16, 2022 (KR) ........................ 10-2022-0116773
Dec. 15, 2022 (KR) ........................ 10-2022-0176283

(51) Int. Cl.
*B60W 30/06* (2006.01)
*B60W 60/00* (2020.01)
*G06N 3/0464* (2023.01)

(52) U.S. Cl.
CPC ........ *B60W 30/06* (2013.01); *B60W 60/0011* (2020.02); *G06N 3/0464* (2023.01)

(58) Field of Classification Search
CPC ............. B60W 30/06; B60W 60/0011; B60W 60/0015; B60W 2556/40; G06N 3/0464; G06N 5/01; G06N 3/0495; G06N 3/0499; G06N 3/09; G06N 3/047; G06N 7/01; G06N 3/044; G06N 3/048
See application file for complete search history.

(56) References Cited

U.S. PATENT DOCUMENTS 10,703,364 B2 * 7/2020 Irie ....................... B60W 30/12
2020/0089246 A1 * 3/2020 McGill, Jr. .............. G06N 3/08
2020/0097015 A1 3/2020 Keselman et al.
(Continued)

FOREIGN PATENT DOCUMENTS

EP 3 971 047 A1 3/2022
KR 10-1339480 B1 12/2013
KR 10-2049962 B1 11/2019

*Primary Examiner* — Aniss Chad
*Assistant Examiner* — Christine Nguyen Huynh
(74) *Attorney, Agent, or Firm* — NSIP Law

(57) ABSTRACT

A device and method with continuous real-time autonomous parking planning and control are disclosed. A method of training a path distribution estimation model includes: obtaining initial information including map information, departure information of an autonomous driving device, and destination information of the autonomous driving device; obtaining paths through which the autonomous driving device is movable by inputting the initial information to the path distribution estimation model which predicts the paths; and training the path distribution estimation model to output a path distribution corresponding to the paths based on the initial information.

13 Claims, 11 Drawing Sheets

(56) References Cited

U.S. PATENT DOCUMENTS

| | | | | |
|---|---|---|---|---|
| 2020/0363813 | A1* | 11/2020 | He | G06N 3/088 |
| 2021/0370968 | A1* | 12/2021 | Xiao | G01C 21/3848 |
| 2022/0073101 | A1* | 3/2022 | Wang | B62D 15/0285 |
| 2022/0276657 | A1 | 9/2022 | Huh et al. | |

* cited by examiner

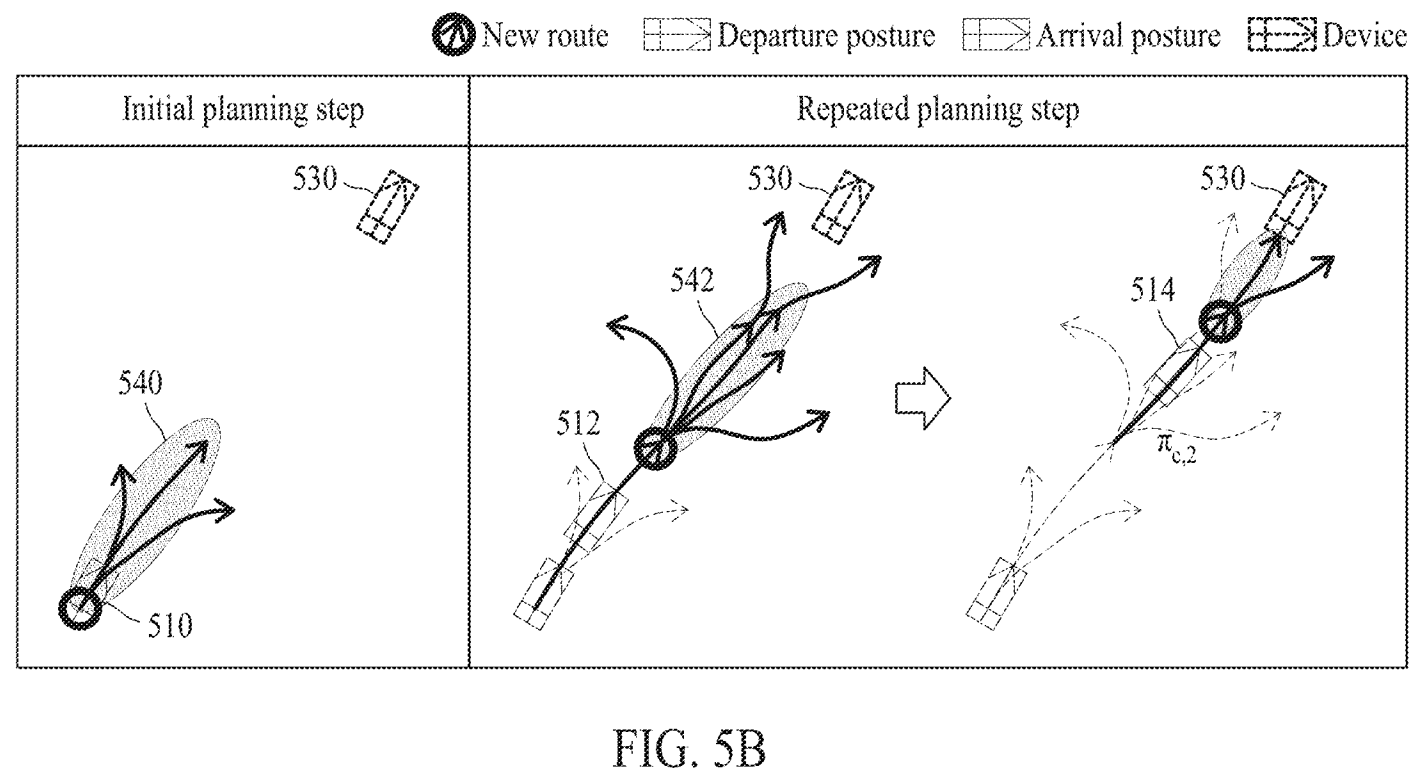

New route
Departure posture
Arrival posture
Device

Initial planning step
Repeated planning step 530
540
510
512
542
514
$\pi_{c,2}$

FIG. 5B

DEVICE AND METHOD WITH CONTINUOUS REAL-TIME AUTONOMOUS PARKING PLANNING AND CONTROL

CROSS-REFERENCE TO RELATED APPLICATIONS

This application claims the benefit under 35 USC § 119(a) of Korean Patent Application No. 10-2022-0116773, filed on Sep. 16, 2022, and Korean Patent Application No. 10-2022-0176283, filed on Dec. 15, 2022, in the Korean Intellectual Property Office, the entire disclosures of which are incorporated herein by reference for all purposes.

BACKGROUND

1. Field

The following description relates to a device and method with continuous real-time autonomous parking planning and control.

2. Description of Related Art

With the advancement of electronics technology, various types of electronic devices are being developed and distributed. In particular, there is active progress in the development of autonomous driving home/personal robots, industrial robots, and devices to be used in various places such as homes, offices, and public places.

SUMMARY

In one general aspect, a method of training a path distribution estimation model includes: obtaining initial information including map information, departure information of an autonomous driving device, and destination information of the autonomous driving device; obtaining paths through which the autonomous driving device is movable by inputting the initial information to the path distribution estimation model which predicts the paths; and training the path distribution estimation model to output a path distribution corresponding to the paths based on the initial information.

The path distribution estimation model may be configured to output the path distribution corresponding to the paths based on a sampling probability distribution of an optimized path.

The map information may include an unknown grid map indicating positions of unknown map information and an occupancy grid map indicating positions of movement obstructions, the departure information includes departure location information, departure posture information, tree route information, and committed trajectory information, and the destination information includes destination location information and destination orientation information.

The path distribution may include: a path distribution based on an unknown grid map indicating positions of unknown map information; a path distribution based on an occupancy grid map indicating positions of movement obstructions; and sine information of departure posture information of the autonomous driving device and cosine information of the departure posture information of the autonomous driving device.

The training of the path distribution estimation model may include training the path distribution estimation model to minimize a loss function determined based on a difference between the paths and a test path obtained by inputting the initial information to the path distribution estimation model.

The path distribution estimation model may include a convolutional neural network (CNN) model.

The path distribution estimation model may include convolution layers, and the convolution layers may include a batch normalization function layer and a ReLu activation function.

In another general aspect, a path estimation method includes: obtaining initial information including map information, departure information of an autonomous driving device, and destination information of the autonomous driving device; obtaining paths, corresponding to the initial information, through which the autonomous driving device is movable, by inputting the initial information to a path distribution estimation model; and determining a final path through which the autonomous driving device is to move based on a path distribution corresponding to the paths.

The paths may be repeatedly obtained in real time based on a sampling probability distribution of an optimal path while the autonomous driving device is autonomously driving.

The obtaining of the initial information may include obtaining the initial information based on sensor data obtained from a sensor of the autonomous driving device.

The map information may include an unknown grid map indicating positions lacking map information and an occupancy grid map indicating non-drivable positions, the departure information includes departure location information, departure posture information, route tree information, and committed trajectory information, and the destination information includes destination location information and destination orientation information.

The route tree information may be generated based on: a first sample that is obtained in an initial planning step of planning autonomous driving from a departure location to an arrival location; and a second sample to satisfy an asymptotic optimal characteristic.

The path distribution may include: a path distribution based on an unknown grid map of positions where map information is unknown; a path distribution based on an occupancy grid map of positions where movement is obstructed; sine information of departure posture information of the autonomous driving device; and cosine information of the departure posture information of the autonomous driving device.

The method may further include repeatedly obtaining new path distributions from the path distribution estimation model based on new actual locations of the autonomous driving device as the autonomous driving device autonomously drives from a departure location to a destination location.

In another general aspect, an electronic device includes: one or more processors; and a memory storing instructions configured to cause the one or more processors to: obtain initial information including map information, departure information of an autonomous driving device, and destination information of the autonomous driving device; obtain paths through which the autonomous driving device is movable by inputting the initial information to a path distribution estimation model; and train the path distribution estimation model to output a path distribution corresponding to the paths based on the initial information.

The path distribution estimation model may be configured to output the path distribution corresponding to the paths in based on a sampling probability distribution of an optimal path and a real time position of the autonomous driving device while the autonomous driving device is autonomously driving based on path distribution.

The instructions may be further configured to cause the one or more processors to train the path distribution estimation model to minimize a loss function determined based on a difference between the paths and a test path obtained by inputting the initial information to the path distribution estimation model.

The path distribution estimation model may include a convolutional neural network (CNN) model.

In yet another general aspect, an electronic device includes: a sensor configured to obtain initial information; one or more processors; a memory storing instructions configured to cause the one or more processors to: obtain initial information including map information, departure information of an autonomous driving device, and destination information of the autonomous driving device; obtain paths that correspond to the initial information and through which the autonomous driving device is movable by inputting the initial information to a path distribution estimation model; and determine a final path through which the autonomous driving device is to autonomously move based on a path distribution corresponding to the plurality of paths.

The instructions may be further configured to cause the one or more processors to obtain the paths in real time based on a sampling probability distribution of an optimal path.

BRIEF DESCRIPTION OF THE DRAWINGS

FIGS. 5A and 5B illustrate an example of real-time motion planning for autonomous parking, according to one or more embodiments.

Figure 1:
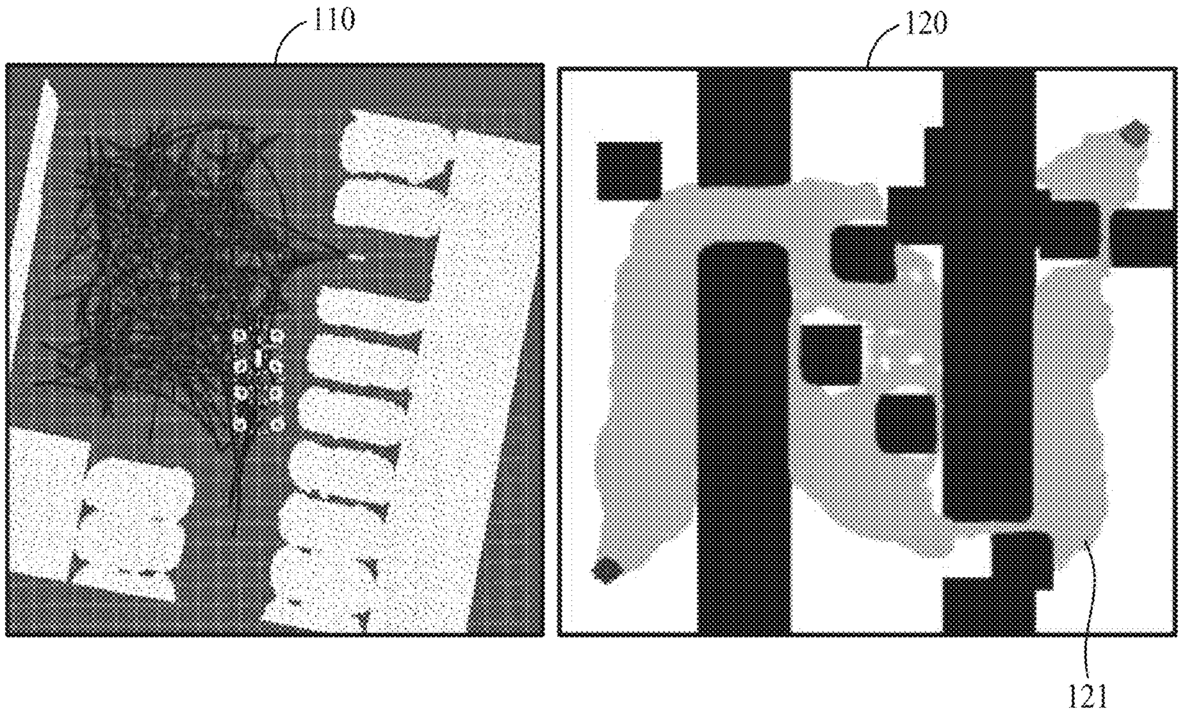
FIG. 1 illustrates an example scenario for planning real-time motion for autonomous parking, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", orA, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example scenario for planning real-time motion for autonomous parking, according to one or more embodiments. Planning real-time motion for autonomous parking may involve continuously/repeatedly performing planning while the autonomous parking is underway so that an overall planned path adapts and changes, according to model predictions, as the autonomous parking progresses.

Referring to FIG. 1, an autonomous driving device may be capable of autonomously driving without a driver's intervention. The autonomous driving device may be implemented as, but is not limited to, a self-driving device, which includes various means of transportation, such as a two-wheeled autonomous driving device, a robot, an air vehicle, and the like. For convenience, autonomous driving devices are described herein as being implemented as self-driving devices.

The autonomous driving device may drive in an autonomous mode according to a recognized driving environment. In some implementations, an autonomous mode may refer to a mode of a device that is equipped with an automatic lane keeping system which generally may drive at a certain speed or below. A driving environment may be recognized through sensors attached to or installed on the autonomous driving device. The sensors may include, for example, a camera, LIDAR, RADAR, and/or ultrasonic sensors, however, examples are not limited thereto. The driving environment may include, but is not limited to, a road, a condition of a road, a type of a lane, presence or absence of another driving device nearby, a distance from a nearby driving device, the weather, presence or absence of obstacles, or the like.

The autonomous driving device may recognize a driving environment and generate a driving path suitable for the recognized environment. The autonomous driving device may control its internal and external mechanical elements so that the autonomous driving device may travel according to the driving path. The autonomous driving device may periodically generate an autonomous driving path.

In order to generate a driving path, the autonomous driving device may proactively plan a path. Planning a path may involve generating many random paths. The autonomous driving device may plan a path based on a sampling-based algorithm. The sampling-based algorithm may include, for example, a rapidly-exploring random tree star (RRT*) algorithm.

Referring to the drawing 110, an RRT* algorithm may generate a path by growing a tree from a starting point to a target point by sampling throughout an entire state space. Hereinafter, performing of sampling on an entire state space may be referred to as "uniform sampling." The RRT* algorithm may advantageously of operate robustly for a high-dimensional and multi-constrained path generation problems. However, since the RRT* algorithm performs sampling on the entire state space, there may be a problem regarding a slow convergence speed, large memory consumption, and a delay in path generation for a narrow passage.

Referring to the drawing 120, the autonomous driving device may determine an area 121 where an optimal path may exist and perform sampling in that area, instead of performing uniform sampling. Performing of sampling in a part of a state space may be referred to as "non-uniform sampling." The area 121 where the optimal path may exist may be referred to as a "feasible path distribution (FPD)." An AI algorithm may be used to obtain an FPD. Prior to describing a method of generating a path, an artificial intelligence (AI) algorithm is described with reference to FIGS. 2A and 2B.

Figures 2A, 2B:
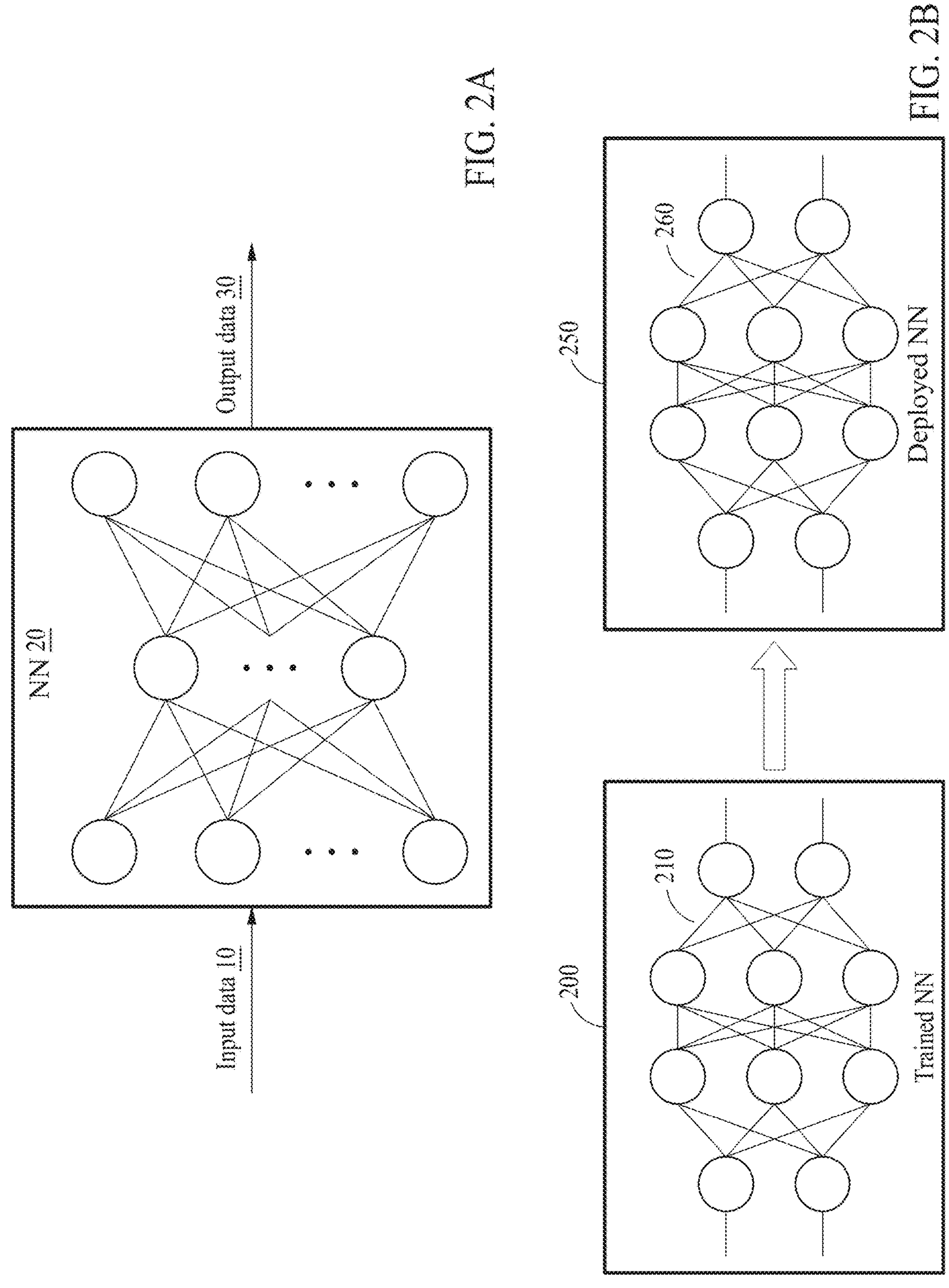
FIG. 2A illustrates an example deep learning computation method using a neural network (NN), according to one or more embodiments.
FIG. 2B illustrates an example method of training and inference of a NN model, according to one or more embodiments.

FIG. 2A illustrates an example deep learning computation method using a neural network (NN), according to one or more embodiments.

An AI algorithm including deep learning may input input data 10 to a NN and learn output data 30 through an operation such as a convolution operation. In the NN, nodes may be connected to each other and may collectively execute to process input data. Neural networks may include, but are not limited to, convolutional neural networks (CNNs), recurrent neural networks (RNNs), deep belief networks (DBNs), restricted Boltzmann machines (RBMs), and the like. In a feed-forward neural network, nodes of the neural network may have links to other nodes. The links may extend in one direction (forward direction) through the neural network.

Referring to FIG. 2A, the input data 10 may be input to the NN and output data 30 may be output from the NN that includes layers. The NN may be, for example, a CNN 20. The NN may be a deep neural network that has at least two layers.

The CNN 20 may be used to extract "features" such as borders, color of lines, labels of objects, etc. from the input data 10. The CNN 20 may include a plurality of layers. Each of the layers may receive data and process data input to a layer to generate data to be output from the layer. Data output from a layer may be a feature map generated by performing a convolution operation on an image or a feature map input to the CNN 20 and a weight value of a filter. Initial layers of the CNN 20 may operate to extract low-level features such as edges or gradients from the input. The next layers of the CNN 20 may gradually extract more complex features in the image such as eyes, noses, etc.

FIG. 2B illustrates an example method of training and inference of an NN model, according to one or more embodiments.

Referring to FIG. 2B, an autonomous driving device may include a training device 200 and an inference device 250. The training device 200 may be a computing device (or component thereof) that is configured to have various processing functions such as generating a neural network, training (or learning) a neural network, or retraining a neural network. The training device 200 may be implemented as various types of devices such as a PC, a server device, a mobile device, or the like.

The training device 200 may generate a trained neural network 210 by repeatedly training (or learning) a given initial neural network. Generating the trained neural network 210 may involve determining parameters of the neural network. The parameters may include various types of data that are input/output to/from the neural network, such as input/output activations, weights, biases, and the like. As a repeated training of the neural network continues, the parameters of the neural network may be tuned to compute a more accurate output (e.g., prediction or inference) for a given input.

The training device 200 may transfer the trained neural network 210 to the inference device 250. The inference device 250 may be included in a mobile device, an embedded device, or the like. The inference device 250 may be hardware for operating a neural network and may be an electronic device that includes a processor, a memory, an input/output (I/O) interface, a display, a communication interface, or a sensor.

The inference device 250 may be a digital device capable of performing computations and equipped with a memory and a microprocessor, such as a tablet PC, a smartphone, a PC (e.g., a laptop computer), an AI speaker, a smart TV, a mobile phone, a navigation device, a web pad, a personal digital assistant (PDA), a workstation, etc.

The inference device 250 may execute the trained neural network 210 without a change to same, or may execute a neural network 260 that is obtained by processing (e.g., quantizing) the trained neural network 210. The inference device 250 executing the processed neural network 260 may be implemented on an independent device separate from the training device 200. However, examples are not limited thereto. The inference device 250 may be implemented in the same device as the training device 200.

Figure 3:
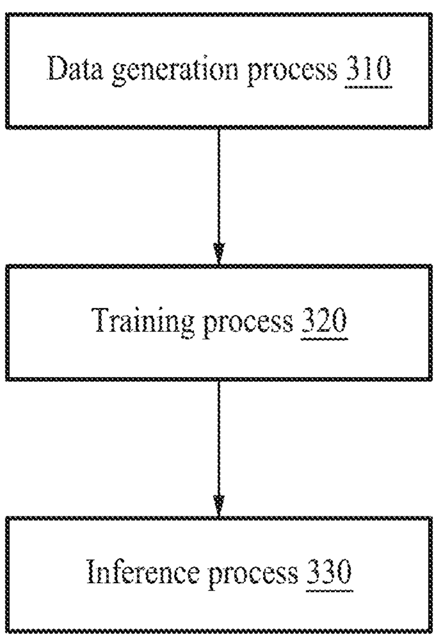
FIG. 3 illustrates an example overall framework for planning a real-time motion for autonomous parking, according to one or more embodiments.

FIG. 3 illustrates an example framework for a method of planning a real-time motion for autonomous parking, according to one or more embodiments. Descriptions given with reference to FIGS. 2A and 2B may generally apply to examples illustrated in FIG. 3.

Referring to FIG. 3, the framework for generating an autonomous driving path may include a data generation process 310, a training process 320, and an inference process 330.

In the training process 320, the training device 200 may train an NN to obtain paths along which an autonomous driving device is movable. The NN may be referred to as a "path distribution estimation model."

In the inference process 330, the inference device 250 may generate an FPD using a trained path distribution estimation model. The inference device 250 may be installed on the autonomous driving device.

Figures 4A, 4B, 4C:
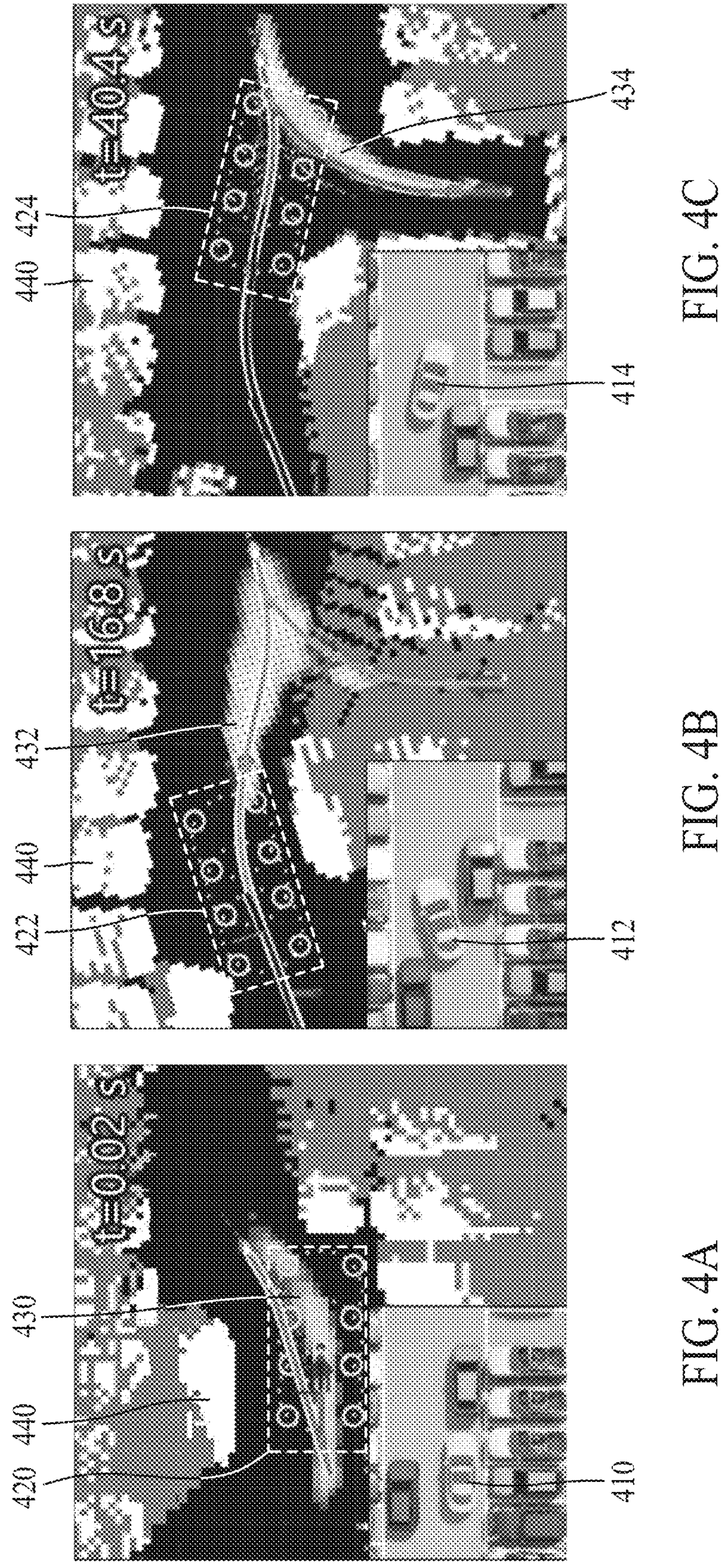
FIGS. 4A to 4C illustrate an example operation of an anytime predictor for planning a real-time motion for autonomous parking, according to one or more embodiments.

FIGS. 4A to 4C illustrate an example operation of an anytime predictor for planning a real-time motion for autonomous parking, according to one or more embodiments.

Referring to FIG. 4A, an electronic device that plans real-time movement for autonomous parking may output a path distribution 430 considering an initial location 420 of an autonomous driving device and obstacle information 440 based on a first actual location 410 of the autonomous driving device. Here, "initial location" refers to a location at the start of a movement phase of (i) predicting a path distribution and (ii) moving according to same. Overall movement may include a sequence of such phases. As shown in FIG. 4A, the electronic device may generate a random sample close to an almost-optimal (optimized) committed trajectory in an initial stage (the committed trajectory being an in-progress or initiated physical movement), e.g., at time t=0.02 s.

When the autonomous driving vehicle has moved to some extent and is at another location, e.g., second actual location 412 in FIG. 4B, the electronic device may output a new path distribution 432 based on a new initial location 422 at a corresponding time (e.g., t=16.8 s) ("initial" refers to the location used when a path distribution is predicted). Similarly, when the autonomous driving device changes to a third actual location 414 as in FIG. 4C, the electronic device may output a path distribution 434 based on a new initial location 424 at a corresponding time (e.g., t=40.4 s). As the electronic device tracks the trajectory through the movement depicted in FIGS. 4A to 4C, the electronic device may, while tracking movement along a committed trajectory (a trajectory currently being implemented/driven) based on the actual location of the autonomous driving device that changes over time, it may sequentially predict a next optimized committed trajectory to additionally optimize additional trajectories. In sum, the electronic device may repeatedly: take an initial position, predict a path distribution according thereto, determine a committed trajectory from the path distribution, move according to the committed trajectory, all while monitoring its location to enable the sequence to be repeated, thus enabling real-time movement planning (and autonomous movement) with repeatedly updated path distributions.

Figure 5A:
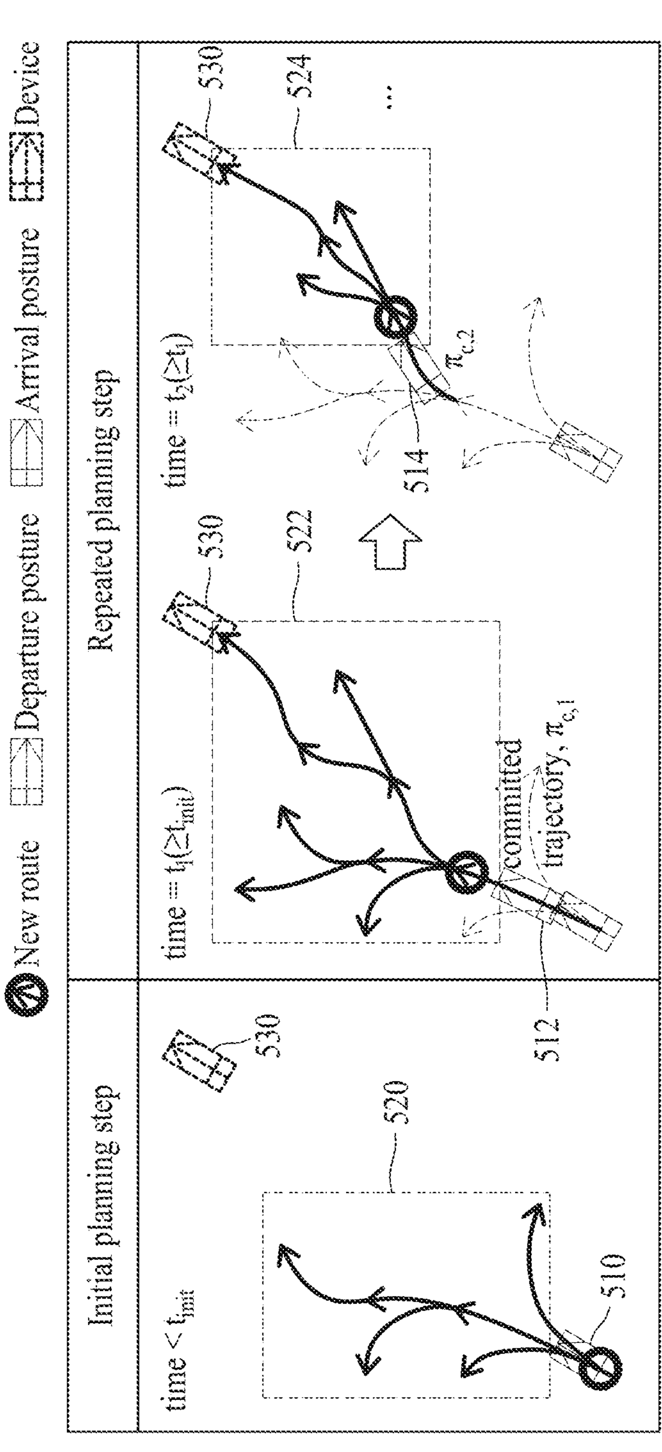

FIGS. 5A and 5B illustrate an example of real-time motion planning for autonomous parking, according to one or more embodiments.

A method of planning a real-time motion for autonomous parking may include an initial planning step and a repeated planning step. In the initial planning step, an electronic device may perform a real-time planning algorithm for a period of time defined by a user for example (a heuristic may be used instead), that is, during an initial planning time. A real-time planning algorithm may be performed according to an area of map information to be applied, may be set to be the same as a control frequency, and may be determined after allocation of more time until all paths to a destination are found. After the initial planning time is up, edge information of a route tree, which is a part of a current optimized trajectory, may be returned. The returned part (i.e., edge information) may be marked as a committed trajectory πc, and edge information of rrc may become a new tree route. An optimized trajectory may be selected by a cost-to-go heuristic at a final posture or by a sum of a path cost at a route and the cost-to-go heuristic (i.e., solution heuristic). The remaining tree route may be continuously (repeatedly) optimized while the autonomous driving device tracks the committed trajectory. After the autonomous driving device reaches a new route in the route tree, a next part after the current optimized trajectory may be selected, and the electronic device may repeat these operations until the autonomous driving device arrives at the destination. This may be performed by computing hardware configured in a manner that is conveniently expressed by Equation 1.

$$\pi(q_s, q_g) = \bigcup_{q_k=q_s}^{q_g} \pi_{c,k}(par(q_k), q_k). \quad \text{Equation 1}$$

In Equation 1, $q_s$ and $q_g$ denote a departure posture and a destination posture, respectively. $q_k$ denotes a new tree route in the repeated planning step and par($q_k$) denotes an upper tree node of $q_k$. Therefore, πc,k(par($q_k$), $q_k$) denotes a committed trajectory. According to Equation 1, a result trajectory is a sequence of committed trajectories. Accordingly, the problem of the real-time framework may be defined as in Equation 2 to minimize a cost function.

$$\mathrm{cost}(\pi(q_s, q_g)) = \sum_{q_s}^{q_g} \mathrm{cost}(\pi_{c,k}(par(q_k), q_k)). \quad \text{Equation 2}$$

Here, a cost function may be a user-defined function, where an attribute of a given node trajectory qk, π(q0, q1) is cost(π(q0, q1))=cost(π(q0, qk))+cost(π(qk, q1)). According to the above attribute, the framework may sequentially find a cheaper committed trajectory at any time. As a result, the problem to be solved by this operation may be modeled as finding an optimal sequence of committed trajectories, which may be defined as in Equation 3.

$$\{\pi_c^*\} = \mathrm{argmin}_{\{\pi_{c,k}\}} \sum_{q_s}^{q_g} \mathrm{cost}(\pi_{c,k}). \quad \text{Equation 3}$$

As Equation 3 shows, in a problem defined as above, a former committed trajectory naturally affects the next committed trajectory, which means if a committed trajectory is not sufficiently optimized, even if the next committed trajectory is highly optimized (or even optimal), an entire result path (of the combined committed trajectories) may not be close to optimal.

To elucidate, referring to FIG. 5A, the electronic device may generate route tree information 520 targeting an destination location 530 based on a location 510 of an autonomous driving device in the initial planning step (time<initial planning time). In the iterated planning step (time 1 initial planning time), which progresses with the movement of the autonomous driving device, new route tree information 522 targeting the destination location 530 may be generated based on a location 512 of the autonomous driving device. If time 2 is the same as or greater than time 1 (time 2 time 1), new route tree information 524 targeting the destination location 530 may be generated based on a location 514 of the autonomous driving device in the repeated/iterated planning step. As shown in Equation 3 above, however, since the earlier route tree information 522 affects the later route tree information 524, if a committed trajectory in the route tree information 522 is not sufficiently optimized, even if a committed trajectory in the tree route information 524 at time 2 is highly optimized, an entire result path may not be close to optimal.

Referring to FIG. 5B, in relation to the above problem, the electronic device may check a step where the electronic device plans a real-time motion for autonomous parking. In the initial planning step, the electronic device may generate a first probability distribution 540 (μc, 1), which may include a first initial optimal committed trajectory (π*c, 1) targeting the destination location 530, based on the initial location 510 of the autonomous driving device and a null committed trajectory (πc, 0). In the repeated planning step, which progresses with the movement of the autonomous driving device, the electronic device may generate a second probability distribution 542 (μc, 2), which may include a second optimal committed trajectory (π*c, 2) targeting the destination location 530, and this generating may be based on a second location 512 of the autonomous driving device and a first committed trajectory (πc, 1). Similarly, the electronic device may generate a probability distribution, which may include a second optimal committed trajectory (π*c,2) targeting the destination location 530, based on a third location 514 of the autonomous driving device that has changed over time and based on a second committed trajectory (πc, 2). The electronic device may use route tree information, destination information, the location 510 of the autonomous driving device and the null committed trajectory (πc, 0) in the initial planning step, and obstacle information as inputs. The location 510 of the autonomous driving device and the null committed trajectory (πc, 0) in the initial planning step may include information on an initial posture of the autonomous driving device. Route tree information may be generated based on sample 2 (e.g., Nuni—"uni" standing for uniform), which is to satisfy an asymptotic optimal characteristic of sample 1 (e.g., Nbias sample) obtained in an initial planning step, and the samples 1 and 2 may be set to be the same number for an appropriate balance between searching and utilization of a real-time motion of the autonomous driving device. The electronic device may allow a real-time planning algorithm to establish route tree information using these N (Nbias_+Nuni) samples. The electronic device may select a current optimal/optimized committed trajectory based on a solution heuristic in the initial planning step and the autonomous driving device may track (drive along) a committed trajectory of the selected optimal trajectory. In the repeated planning step, the electronic device may predict a probability distribution of a next committed trajectory πc,2(q1, q2) by using a committed trajectory πc,1(qego, q1) being currently tracked, obstacle information, and destination information as inputs and may repeat this process until the autonomous driving device reaches the target.

Figure 6:
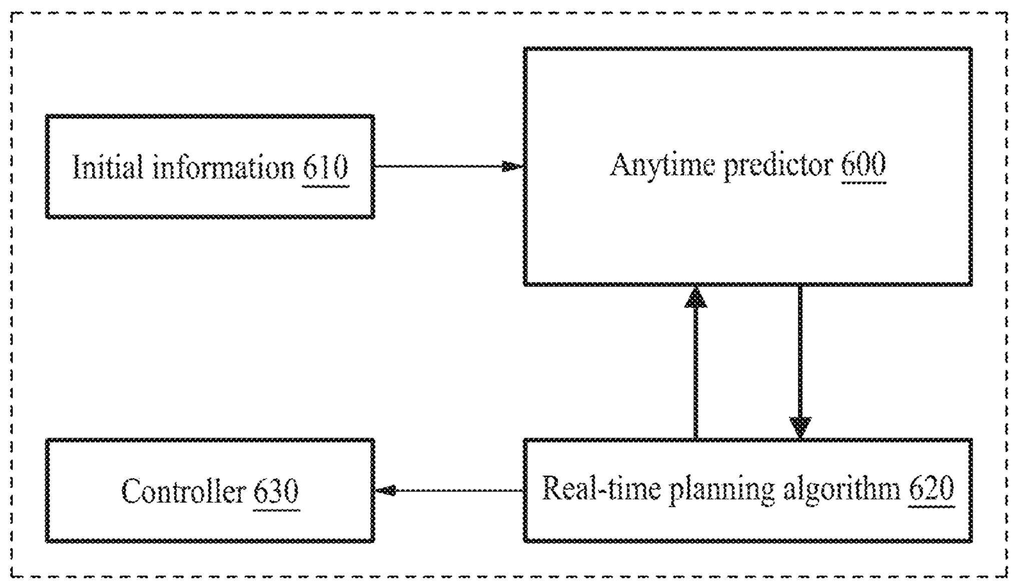
FIG. 6 illustrates an example structure of a system that plans autonomous parking in real time, according to one or more embodiments.

FIG. 6 illustrates an example structure of a system that plans autonomous parking in real time, according to one or more embodiments.

Referring to FIG. 6, the system may receive initial information 610 including map information, departure information of an autonomous driving device, and destination information of the autonomous driving device. The system may input the initial information 610 to an anytime predictor 600, which may retain the initial information 610 for ongoing use and which may output a path distribution that corresponds to paths through which the autonomous driving device is movable in real time, based on a sampling probability distribution of an optimal path. The system may input a predicted committed trajectory predicted (and outputted) by the anytime predictor 600 to a real-time planning algorithm 620. Based thereon, the real-time planning algorithm 620 generate new tree route information and determine a committed trajectory, both of which may be inputted to the anytime predictor 600, and the system may thus output (from the anytime predictor 600) a path distribution that corresponds to paths through which the autonomous driving device is movable in real time. The committed trajectory and new route tree information obtained through the real-time planning algorithm 620 may also be inputted to a controller 630 to be used to control (drive) the autonomous driving device.

Figure 7:
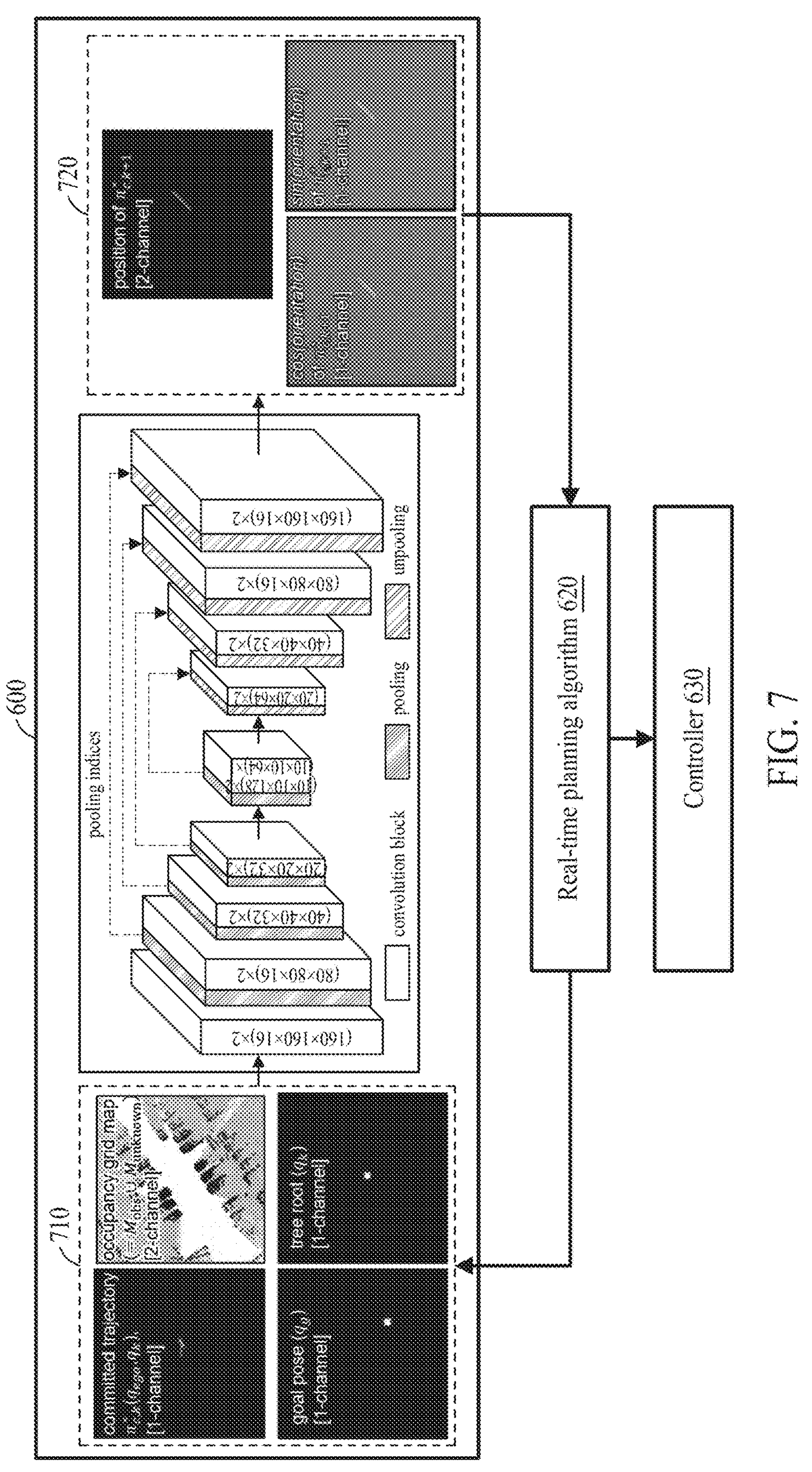
FIG. 7 illustrates an example configuration of an anytime predictor included in a path distribution estimation model for real-time planning of motion for autonomous parking, according to one or more embodiments.

FIG. 7 illustrates an example configuration of an anytime predictor included in a path distribution estimation model for real-time planning of motion for autonomous parking, according to one or more embodiments.

Referring to FIG. 7, the anytime predictor 600 included in a path distribution estimation model may train the path distribution estimation model to output output information 720 including a path distribution that corresponds to paths based on initial information 710 including map information, departure information of an autonomous driving device, and destination information of the autonomous driving device.

As shown in FIG. 7, the output information 720 may include the predicted committed trajectory predicted by the anytime predictor 600, which may be input to the real-time planning algorithm 620. The committed trajectory and new route tree information obtained through the real-time planning algorithm 620 may become initial information 710 in real time and be input to the anytime predictor 600. The committed trajectory and new tree route information obtained through the real-time planning algorithm 620 may be input to the controller 630 to be used to control the autonomous driving device, as described with reference to FIG. 6.

The initial information 710 that is used for training the anytime predictor 600 may include a 5-channel grid map. The channels of the 5-channel grid map may include (i) an unknown grid map associated with a trajectory of the autonomous driving device, (ii) an occupancy grid map where each grid element has a value between "0" and "1" ("0" representing free space "1" representing occupied space) in which a path may be generated, (iii) tree route information qk including information on a path through which the autonomous driving device is to move, (iv) destination information qg of the autonomous driving device, and (v) a committed trajectory (πc,k) that the autonomous driving device is currently tracking/following. The committed trajectory may be represented as a set of relative locations (positions) and respective postures (orientations) of the autonomous driving device. Destination information and route tree information may include information on a relative posture of the autonomous driving device, which may be represented as an n×n square including location and direction information of the autonomous driving device.

The output information 720, a result of a training of the anytime predictor 600, may include a 4-channel grid map (Mout). At least two out of channels of the 4-channel grid map may include a respective path distribution of paths output by the path distribution estimation model based on initial information of an unknown grid map and an occupancy grid map. Each channel may include probabilities of whether respective grid elements are included in a following (next) committed trajectory πc, k+1. The electronic device may obtain probabilities of whether respective grid elements are included in πc, k+1 using a softmax function (e.g., a trajectory distribution μc, k+1). At least the other two channels of the 4-channel grid map may include a recurrent result, sine information of departure posture information of the autonomous driving device, and cosine information of the departure posture information of the autonomous driving device. In a sampling step, the electronic device may extract a grid sample from μc, k+1 by low-variance sampling. The electronic device may assign a direction to each sample by calculating a tan 2(sin(θ), cos(θ)) corresponding to the grid of the two channels. Thus, each sample may be marked as a posture p[i]=pred(xi, yi, θi), i.e., at a predicted location and direction/orientation.

The anytime predictor 600 may be (or may include) a CNN model. The anytime predictor 600 may include convolution layers, and the convolution layers may include a convolution layer with a "3×3" kernel and stride of "1". After that, a "2×2" max pooling layer or "2×2" unpooling layer may follow each block. Every convolution block except last (output) layer may include a batch normalization function layer and a ReLu activation function.

Training the anytime predictor 600 included in the path distribution estimation model may include training the path distribution estimation model to minimize a loss function determined based on a difference between the paths and a test path obtained by inputting the initial information to the path distribution estimation model. The loss function may be defined as in Equation 4.

$$\text{Loss} = L_{wce}(M_{label}, M_{out}) + L_{wmse}(M_{label}, M_{out}) \quad \text{Equation 4}$$

In Equation 4, $M_{label}$ denotes the test path, $M_{out}$ denotes a set of paths, $L_{wce}(M_{label}, M_{out})$ denotes a weighted cross entropy error, and $L_{wmse}(M_{label}, M_{out})$ denotes a weighted mean square error.

Figures 8, 9:
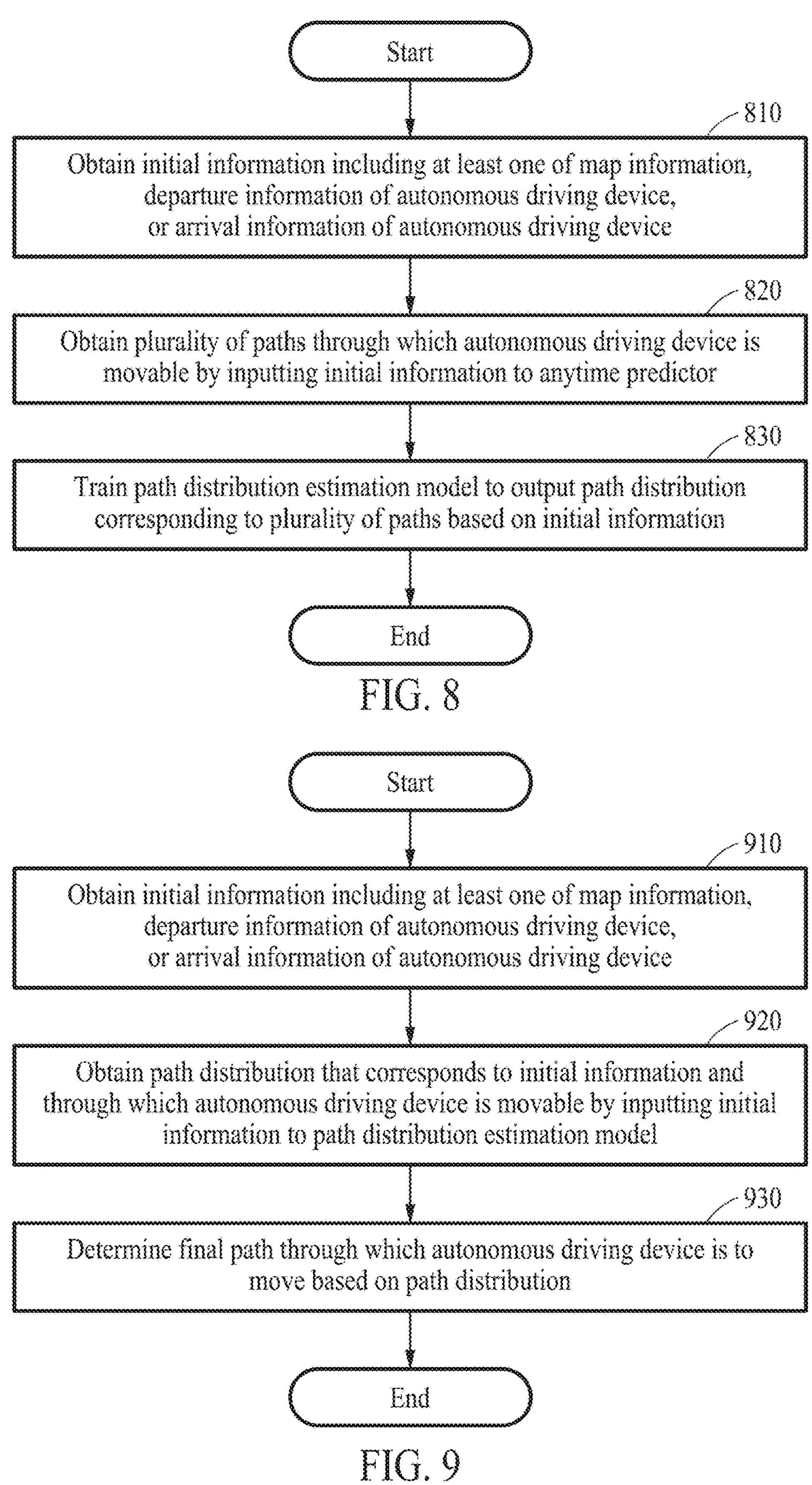
FIG. 8 illustrates an example method of training a path distribution estimation model for real-time autonomous parking planning, according to one or more embodiments.
FIG. 9 illustrates an example method of continuous real-time planning of autonomous parking motion, according to one or more embodiments.

FIG. 8 illustrates an example method of training a path distribution estimation model for real-time autonomous parking planning, according to one or more embodiments.

Referring to FIG. 8, in operation 810, an electronic device for training the path distribution estimation model may obtain initial information including map information, departure information of an autonomous driving device, and destination information of the autonomous driving device. The electronic device may obtain the initial information 610 as described with reference to FIG. 6.

In operation 820, the electronic device may obtain a set of paths through which the autonomous driving device is movable by inputting the initial information to an anytime predictor. The electronic device may obtain the set of paths through which the autonomous driving device is movable through the anytime predictor 600 and the real-time planning algorithm 620, as described with reference to FIG. 6.

In operation 830, the electronic device may train the path distribution estimation model to output a path distribution of paths based on the initial information. The training may include training the path distribution estimation model to minimize a loss function determined based on a difference between the of paths and a test path obtained by inputting the initial information to the path distribution estimation model.

FIG. 9 illustrates an example method of continuous real-time planning of autonomous parking motion, according to one or more embodiments.

Referring to FIG. 9, in operation 910, an electronic device for planning a real-time motion for autonomous parking may obtain initial information including map information, departure information of an autonomous driving device, and destination information of the autonomous driving device. The electronic device may obtain the initial information as described with reference to FIG. 5B.

In operation 920, the electronic device may obtain a path distribution that corresponds to the initial information and through which the autonomous driving device is movable by inputting the initial information to a path distribution estimation model. As described with reference to FIG. 5B, the electronic device may generate the probability distribution 542, which may include an optimized committed trajectory targeting the destination location 530 in a next operation, based on a change in location 512 caused by autonomous driving of the autonomous driving device.

In operation 930, the electronic device may determine a final path through which the autonomous driving device is to move based on the path distribution. As described with reference to FIG. 5B, the electronic device may determine a final path targeting the destination location 530 in the repeated planning step.

Figure 10:
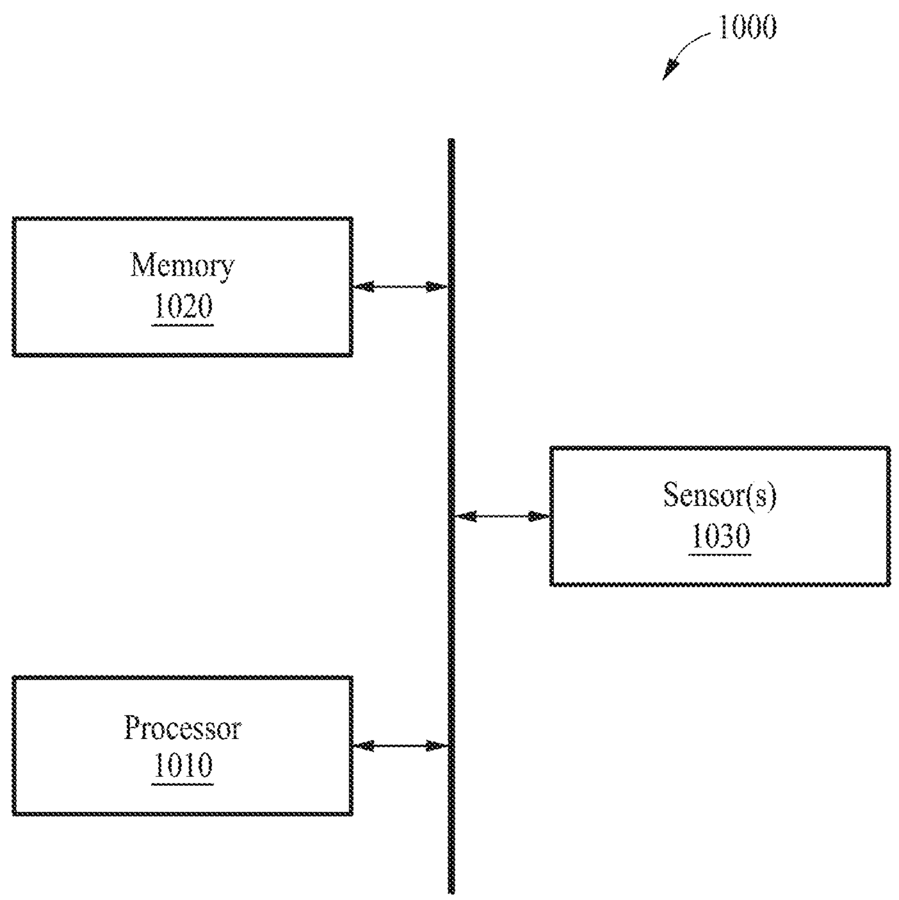
FIG. 10 illustrates an example configuration of a device for training a path distribution estimation model for real-time autonomous parking motion planning, according to one or more embodiments.

FIG. 10 illustrates an example configuration of a device for training a path distribution estimation model for real-time autonomous parking motion planning, according to one or more embodiments.

Referring to FIG. 10, a training device 1000 may include a processor 1010, a memory 1020, and sensor(s) 1030. Descriptions given with reference to FIGS. 2A to 9 are generally applicable to FIG. 10. The training device 200 of FIG. 2B may be the training device 1000 of FIG. 10.

The memory 1020 may store computer-readable instructions. When instructions stored in the memory 1020 are executed by the processor 1010, the processor 1010 may process operations defined by the instructions. The memory 1020 may include random access memory (RAM), dynamic random access memory (DRAM), static random access memory (SRAM), or other types of non-volatile memory known in the art. The memory 1020 may store a trained NN model.

The sensor(s) 1030 may include, for example, LIDAR, RADAR, and ultrasound sensors, however, examples are not limited thereto. A function of each sensor may be intuitively inferred by one of ordinary skill in the art, and thus descriptions thereof are omitted.

The processor 1010 may control the overall operation of the training device 1000. The processor 1010 may be a hardware-implemented device with a circuit that has a physical structure to perform desired operations. The desired operations may include code or instructions in a program. The hardware-implemented device may include a microprocessor, a central processing unit (CPU), a graphics processing unit (GPU), a processor core, a multi-core processor, a multiprocessor, an application-specific integrated circuit (ASIC), a field programmable gate array (FPGA), a neural processing unit (NPU), and the like.

The processor 1010 may control the training device 1000 by executing a function and instructions that the training device 1000 is configured to execute.

Under control by the processor 1010, the training device 1000 may obtain initial information including map information, departure information of an autonomous driving device, and destination information of the autonomous driving device, obtain a set of paths through which the autonomous driving device is movable by inputting the initial information to the anytime predictor, and train the path distribution estimation model to output a distribution of paths based on the initial information.

Figure 11:
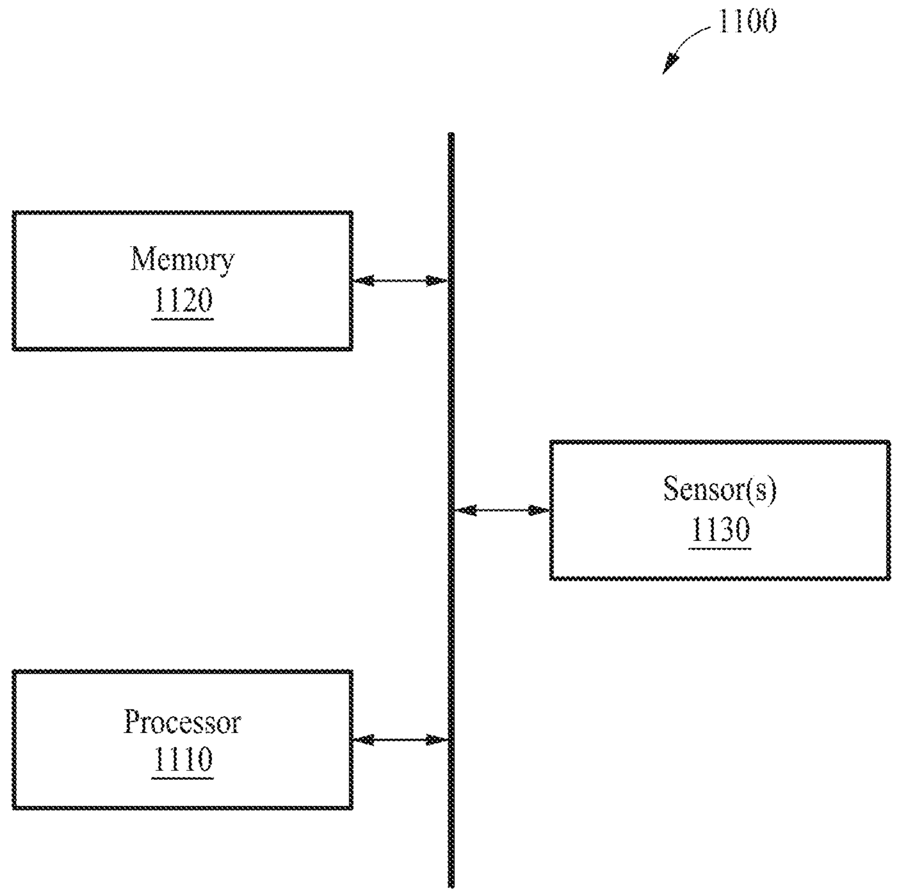
FIG. 11 illustrates an example configuration of an electronic device for continuous real-time planning of autonomous parking, according to one or more embodiments.

FIG. 11 illustrates an example configuration of an electronic device for continuous real-time planning of autonomous parking, according to one or more embodiments.

Referring to FIG. 11, an electronic device 1100 may include a processor 1110, a memory 1120, and sensor(s) 1130. Descriptions given with reference to FIGS. 2A to 9 are generally applicable to FIG. 11. The inference device 250 of FIG. 2B may be the electronic device 1100 of FIG. 11.

The memory 1120 may store computer-readable instructions. When instructions stored in the memory 1120 are executed by the processor 1110, the processor 1110 may process operations defined by the instructions. The memory 1120 may include RAM, DRAM, SRAM, or other types of non-volatile memory known in the relevant field of technology. The memory 1120 may store a trained NN model.

The sensor(s) 1130 may include, for example, LIDAR, RADAR, and ultrasound sensors, however, examples are not limited thereto. A function of each sensor may be intuitively inferred by one of ordinary skill in the art and thus descriptions thereof are omitted.

The processor 1110 may control the overall operation of the electronic device 1100. The processor 1110 may be a hardware-implemented device with a circuit that has a physical structure to perform desired operations. The desired operations may include code or instructions in a program. The hardware-implemented device may include a microprocessor, a CPU, a GPU, a processor core, a multi-core processor, a multiprocessor, an ASIC, an FPGA, an NPU, and the like. The processor 1110 may be any one of, or any combination of, various types of processors, including those mentioned.

The processor 1110 may control the electronic device 1100 by executing a function and instructions that the electronic device 1100 is configured to execute.

Under control by the processor 1110, the electronic device 1100 may obtain initial information including map information, departure information of an autonomous driving device, and destination information of the autonomous driving device, obtain a set of paths through which the autonomous driving device is movable by inputting the initial information to the path distribution estimation model, and determine a final path through which the autonomous driving device is to move based on a path distribution of the set paths.

The computing apparatuses, the vehicles, the electronic devices, the processors, the memories, the vehicle/operation function hardware, the autonomous driving systems, the assisted driving systems, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method comprising:

obtaining, by a processor, initial information comprising map information including obstacle information, departure information of an autonomous driving device, and destination information of the autonomous driving device;

obtaining, by the processor, paths through which the autonomous driving device is movable in real time, by inputting the initial information to the path distribution estimation model which outputs a path distribution corresponding to the paths based on a sampling probability distribution of an optimized path; and training, by the processor, the path distribution estimation model to output the path distribution corresponding to the paths, which includes an optimal committed trajectory targeting a destination location based on the initial information wherein the path distribution estimation model comprises a convolutional neural network (CNN) model, wherein the path distribution estimation model is configured to input the initial information in a form of a 5-channel grid map, which comprising (i) an unknown grid map associated with a trajectory of the autonomous driving device, (ii) an occupancy grid map in which a path may be generated, (iii) tree route information including an information on the path through which the autonomous driving device is to move, (iv) the destination information of the autonomous driving device, and (v) a committed trajectory information that the autonomous driving device is currently following, and wherein the path distribution estimation model is configured to output the path distribution in a form of a 4-channel grid map, which comprising (i, ii) a respective path distribution of the paths output by the path distribution estimation model based on the initial information of the unknown grid map and the occupancy grid map, (iii) sine information of departure posture information of the autonomous driving device, and (iv) cosine information of the departure posture information of the autonomous driving device as a recurrent result.

2. The method of claim 1, wherein the map information comprises the unknown grid map indicating positions of unknown map information and the occupancy grid map indicating positions of movement obstructions, the departure information comprises departure location information, departure posture information, the tree route information, and the committed trajectory information, and the destination information comprises destination location information and destination orientation information.

3. The method of claim 1, wherein the training of the path distribution estimation model comprises training the path distribution estimation model to minimize a loss function determined based on a difference between the paths and a test path obtained by inputting the initial information to the path distribution estimation model.

4. The method of claim 1, wherein the path distribution estimation model comprises convolution layers, and the convolution layers comprise a batch normalization function layer and a ReLu activation function.

5. A path estimation method, the method comprising:

obtaining, by a processor, initial information comprising map information including obstacle information, departure information of an autonomous driving device, and destination information of the autonomous driving device;

obtaining, by a processor, paths, corresponding to the initial information, through which the autonomous driving device is movable in real time, by inputting the initial information to a path distribution estimation model;

generating, by the processor, a first path distribution corresponding to the paths, which includes a first initial optimal committed trajectory targeting a destination location, based on the initial location of the autonomous driving device, a null committed trajectory and the obstacle information in an initial planning step, by the path distribution estimation model which outputs a path distribution corresponding to the paths based on a sampling probability distribution of an optimized path;

generating, by the processor, a second path distribution which includes a second optimal committed trajectory targeting the destination location, based on a second location of the autonomous driving device, a first committed trajectory for a previous step and the obstacle information in a repeated planning step; and determining, by the processor, a final path targeting the destination location to control movement of the autonomous driving vehicle, wherein the final path formed of an committed trajectory which is predicted and selected by, for each iteration in the repeated planning step, wherein the path distribution estimation model comprises a convolutional neural network model, wherein the path distribution estimation model is configured to input the initial information in a form of a 5-channel grid map, which comprising (i) an unknown grid map associated with a trajectory of the autonomous driving device, (ii) an occupancy grid map in which a path may be generated, (iii) tree route information including an information on the path through which the autonomous driving device is to move, (iv) the destination information of the autonomous driving device, and (v) a committed trajectory information that the autonomous driving device is currently following, and wherein the path distribution estimation model is configured to output a path distribution in a form of a 4-channel grid map, which comprising (i, ii) a respective path distribution of the paths output by the path distribution estimation model based on the initial information of the unknown grid map and the occupancy grid map, (iii) sine information of departure posture information of the autonomous driving device, and (iv) cosine information of the departure posture information of the autonomous driving device as a recurrent result.

6. The method of claim 5, wherein the obtaining of the initial information comprises obtaining the initial information based on sensor data obtained from a sensor of the autonomous driving device.

7. The method of claim 5, wherein the map information comprises the unknown grid map indicating positions lacking map information and the occupancy grid map indicating non-drivable positions, the departure information comprises departure location information, departure posture information, the route tree information, and the committed trajectory information, and the destination information comprises destination location information and destination orientation information.

8. The method of claim 7, wherein the route tree information is generated based on: a first sample that is obtained in the initial planning step of planning autonomous driving from a departure location to an arrival location; and a second sample to satisfy an asymptotic optimal characteristic.

9. The method of claim 5, further comprising repeatedly obtaining new path distributions from the path distribution estimation model based on new actual locations of the autonomous driving device as the autonomous driving device autonomously drives from a departure location to a destination location.

10. An electronic device comprising:

one or more processors; and a memory storing instructions configured to cause the one or more processors to:

obtain initial information comprising map information including obstacle information, departure information of an autonomous driving device, and destination information of the autonomous driving device;

obtain paths through which the autonomous driving device is movable in real time, by inputting the initial information to a path distribution estimation model which outputs a path distribution corresponding to the paths based on a sampling probability distribution of an optimized path; and train the path distribution estimation model to output the path distribution corresponding to the paths, which includes an optimal committed trajectory targeting a destination location based on the initial information, wherein the path distribution estimation model comprises a convolutional neural network model, wherein the path distribution estimation model is configured to input the initial information in a form of a 5-channel grid map, which comprising (i) an unknown grid map associated with a trajectory of the autonomous driving device, (ii) an occupancy grid map in which a path may be generated, (iii) tree route information including an information on the path through which the autonomous driving device is to move, (iv) the destination information of the autonomous driving device, and (v) a committed trajectory information that the autonomous driving device is currently following, and wherein the path distribution estimation model is configured to output the path distribution in a form of a 4-channel grid map, which comprising (i, ii) a respective path distribution of the paths output by the path distribution estimation model based on the initial information of the unknown grid map and the occupancy grid map, (iii) sine information of departure posture information of the autonomous driving device, and (iv) cosine information of the departure posture information of the autonomous driving device as a recurrent result.

11. The electronic device of claim 10, wherein the path distribution estimation model is configured to output the path distribution corresponding to the paths based on a sampling probability distribution of an optimal path and a real time position of the autonomous driving device while the autonomous driving device is autonomously driving based on path distribution.

12. The electronic device of claim 10, wherein the instructions are further configured to cause the one or more processors to train the path distribution estimation model to minimize a loss function determined based on a difference between the paths and a test path obtained by inputting the initial information to the path distribution estimation model.

13. An electronic device comprising:

a sensor configured to obtain initial information;

one or more processors;

a memory storing instructions configured to cause the one or more processors to:

obtain initial information comprising map information including obstacle information, departure information of an autonomous driving device, and destination information of the autonomous driving device;

obtain paths that correspond to the initial information and through which the autonomous driving device is movable in real time, by inputting the initial information to a path distribution estimation model;

generate a first path distribution corresponding to the paths, which includes a first initial optimal committed trajectory targeting a destination location, based on the initial location of the autonomous driving device, a null committed trajectory and the obstacle information in an initial planning step, by the path distribution estimation model which outputs a path distribution corresponding to the paths based on a sampling probability distribution of an optimized path;

generate a second path distribution which includes optimal a second optimal committed trajectory targeting the destination location, based on a second location of the autonomous driving device, a first committed trajectory for a previous step and the obstacle information in a repeated planning step; and determine a final path targeting the destination location to control movement of the autonomous driving vehicle, wherein the final path formed of an committed trajectory which is predicted and selected by, for each iteration in the repeated planning step, wherein the path distribution estimation model comprises a convolutional neural network model, wherein the path distribution estimation model is configured to input the initial information in a form of a 5-channel grid map, which comprising (i) an unknown grid map associated with a trajectory of the autonomous driving device, (ii) an occupancy grid map in which a path may be generated, (iii) tree route information including an information on the path through which the autonomous driving device is to move, (iv) the destination information of the autonomous driving device, and (v) a committed trajectory information that the autonomous driving device is currently following, wherein the path distribution estimation model is configured to output a path distribution in a form of a 4-channel grid map, which comprising (i, ii) a respective path distribution of the paths output by the path distribution estimation model based on the initial information of the unknown grid map and the occupancy grid map, (iii) sine information of departure posture information of the autonomous driving device, and (iv) cosine information of the departure posture information of the autonomous driving device as a recurrent result.

* * * * *